(12) United States Patent
Leahy

(10) Patent No.: US 6,959,902 B2
(45) Date of Patent: *Nov. 1, 2005

(54) BREAKAWAY SIGNPOST CONNECTOR

(76) Inventor: Lawrence E. Leahy, 1034 W. Adams, Auburn, IL (US) 62615

( * ) Notice: Subject to any disclaimer, the term of this patent is extended or adjusted under 35 U.S.C. 154(b) by 362 days.

This patent is subject to a terminal disclaimer.

(21) Appl. No.: 10/004,057

(22) Filed: Nov. 2, 2001

(65) Prior Publication Data

US 2003/0084621 A1 May 8, 2003

(51) Int. Cl.[7] ............................................... F16M 13/00
(52) U.S. Cl. .......................... 248/548; 248/530; 403/2; 52/98; 52/296
(58) Field of Search ................................ 248/511, 548, 248/530, 519, 156, 909, 638; 403/2, 327, 300, 363; 411/3, 4, 5, 389, 246, 546; 256/13.1; 174/152; 52/98, 296, 297, 170

(56) References Cited

U.S. PATENT DOCUMENTS

| | | | | |
|---|---|---|---|---|
| 3,521,413 A | * | 7/1970 | Scott et al. ..................... 52/98 |
| 3,769,774 A | * | 11/1973 | Barnes ......................... 52/698 |
| 3,967,906 A | * | 7/1976 | Strizki ............................ 403/2 |
| 4,007,563 A | * | 2/1977 | Nakagawa ...................... 52/98 |
| 4,565,466 A | * | 1/1986 | Daggs et al. ................. 404/10 |
| 4,737,048 A | * | 4/1988 | Herrstrom ................... 403/229 |
| 5,354,144 A | * | 10/1994 | Lizakowski .................. 404/10 |
| 5,400,997 A | * | 3/1995 | Payne et al. ................. 248/523 |
| 5,875,578 A | * | 3/1999 | Grewe .......................... 40/608 |
| 6,113,051 A | * | 9/2000 | Moradell et al. ........... 248/430 |
| 6,308,927 B1 | * | 10/2001 | Leahy ......................... 248/548 |
| 6,390,734 B1 | * | 5/2002 | Marshall ..................... 405/230 |
| 6,540,196 B1 | * | 4/2003 | Ellsworth ................... 248/548 |

* cited by examiner

Primary Examiner—Carl D. Friedman
Assistant Examiner—Chi Q. Nguyen
(74) Attorney, Agent, or Firm—Armstrong Teasdale LLP

(57) ABSTRACT

A breakaway signpost connector for attaching a sign support member to an anchor member. The connector includes a shear member having a first end, a second end, and a necked-down section between the first and second ends. A spring surrounds the shear member and supports the necked-down section.

28 Claims, 5 Drawing Sheets

BREAKAWAY SIGNPOST CONNECTOR

BACKGROUND OF THE INVENTION

This invention relates generally to signposts and, more particularly, to breakaway signposts for signs adjacent to roadways.

A roadway sign typically includes an anchor that is driven into the ground, an extended support connected to the anchor and extending above the ground, and a sign attached to the support. Due to their proximity to the roadway, road signs may be a hazard for errant vehicles.

The Federal Highways Administration ("FHWA") has promulgated yielding criteria for signposts and structures located adjacent to designated traffic areas both to protect the occupants of vehicles and to reduce property damage from collisions with these structures. For small and intermediate roadside supports, the FHWA standards required a structure weak enough to bend upon impact and allow a vehicle to pass over the support structure with minimum deceleration. Thus, occupant interior impact could be avoided and vehicular damage could be minimized. After a collision, however, the entire roadway sign support needs to be replaced, including the anchor in many cases.

To avoid the cost of replacing the anchors after a collision, signposts have been designed in which the sign support shears from the anchor upon impact so that the anchor may subsequently be reused with a replacement support after a collision. Couplers machined or cast with predetermined break points, such as shear bolts, have been employed with some success to separate the sign support and the anchor so that the anchor is undamaged when a vehicle collides with a signpost. However, the couplers are vulnerable to shearing from wind loads on a sign.

BRIEF DESCRIPTION OF THE INVENTION

In one aspect, a breakaway signpost connector is provided for attaching a sign support member to an anchor member. The connector includes a shear member having a first end, a second end, and a necked-down section between the first and second ends. A spring surrounds the shear member and supports the necked-down section.

In another aspect, a breakaway signpost assembly is provided. The assembly includes an anchor member that comprises an anchor plate and a ground member. The anchor plate is connected to the ground member and includes a threaded opening. The assembly further includes a shear bolt that comprises a threaded first end, a second end, and a necked-down section. The necked-down section separates the first end and the second end. The first end engages the opening and the second end includes a shoulder. A spring surrounds the bolt and the shoulder, and contacts the anchor plate. A support member contacts the bushing and the spring, and is attached to the bolt at the bolt second end.

In yet another aspect, a method is provided for assembling a breakaway signpost. The signpost includes an anchor member, a support member, a shear member, and a spring. The anchor member includes an anchor plate and a ground member. The anchor plate is connected to the ground member and includes an opening therethrough. The support member includes a support plate and a sign support. The support plate is connected to the sign support and includes an aperture therethrough. The shear member includes a necked-down section between a first end and a second end. The second end comprises a shoulder. The method includes anchoring the ground member, extending the first end of the shear member through the opening of the anchor plate, attaching the shear member to the anchor plate, inserting the spring over the shear member, inserting the second end of the shear member through the support plate, and attaching the shear member to the support plate.

In a further embodiment, an anchor member is provided for installing a sign support member and a breakaway signpost connector. The anchor member includes a ground member having a first end and a first end wall, and an anchor plate connected to the ground member at the first end such that the anchor plate and the first end wall form a recess within the first end of the ground member.

DETAILED DESCRIPTION OF THE INVENTION

Figure 1:
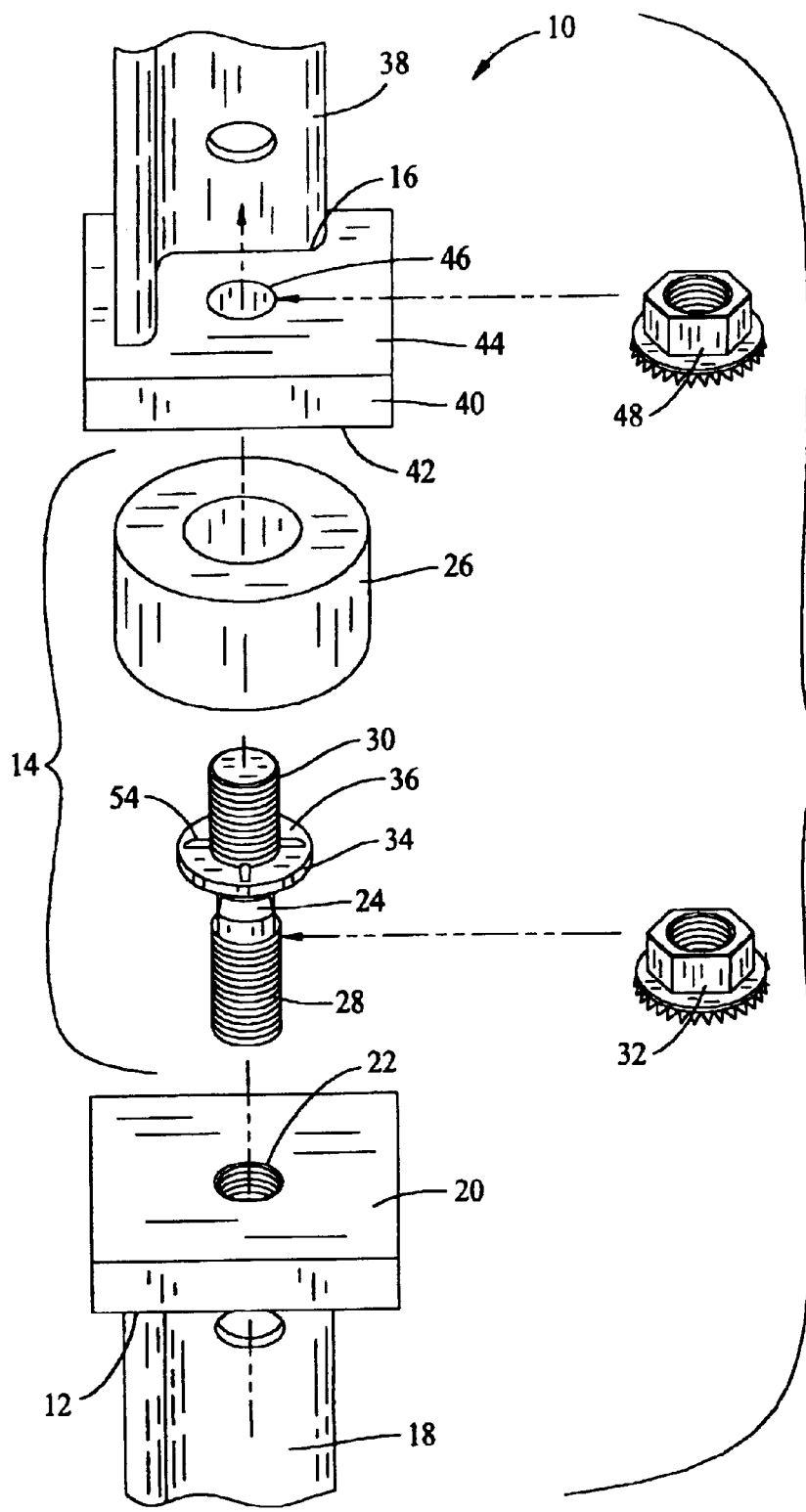
FIG. 1 is an exploded view of a known breakaway signpost assembly.

FIG. 1 is an exploded view of a known breakaway signpost assembly 10 including an anchor member 12, a breakaway connector 14, and a support member 16. The breakaway connector 14 allows the support member 16 to shear from the anchor portion 12 upon vehicular impact while preventing shearing from heavy wind loads.

Anchor member 12 includes a ground anchor connector 18 and an anchor plate 20. Ground anchor connector 18 is elongated and attached to anchor plate 20. Anchor plate 20 is substantially perpendicular to ground anchor connector 18. Anchor plate 20 is attached to ground anchor connector 18 and includes a threaded opening 22 therethrough.

Breakaway connector 14 includes a shear member 24 and a bushing 26. Shear member 24 includes a first threaded end 28 and a second threaded end 30. First end 28 is threaded through anchor plate opening 22 and is secured to anchor plate 20 with a first flanged, serrated nut 32. Second end 30 of shear member 24 includes a shoulder 34. Shoulder 34 is substantially circular and has an outer radius and a top surface 36.

Bushing 26 is inserted over and substantially surrounds shear member 24. Bushing 26 is made of a resilient material, is substantially cylindrical, and includes an inner radius and an outer radius. The inner radius of bushing 26 is substantially equal to the outer radius of shoulder 34 and first flange nut 32, thereby having a slight intentional interference fit with shoulder 34 and flange nut 32.

Support member 16 includes a sign support 38 and a support plate 40. Sign support 38 is elongated and attached to support plate 40. Support plate 40 is substantially perpendicular to sign support 38. Support plate 40 includes a first side 42, a second side 44 and an aperture 46 therethrough. Support plate 40 is attached to sign support connector 38.

Second end 30 of shear member 24 extends through support plate aperture 46 and support plate 40 is attached to second end 30 with a second flanged, serrated nut 48. Top surface 36 of shoulder 34 contacts first side 42 of support plate 40 and engages first side 42 with a biting action as second flanged nut 48 is tightened. Thus, support plate 40 is retained between shoulder 34 and second flanged nut 48.

Figure 2:
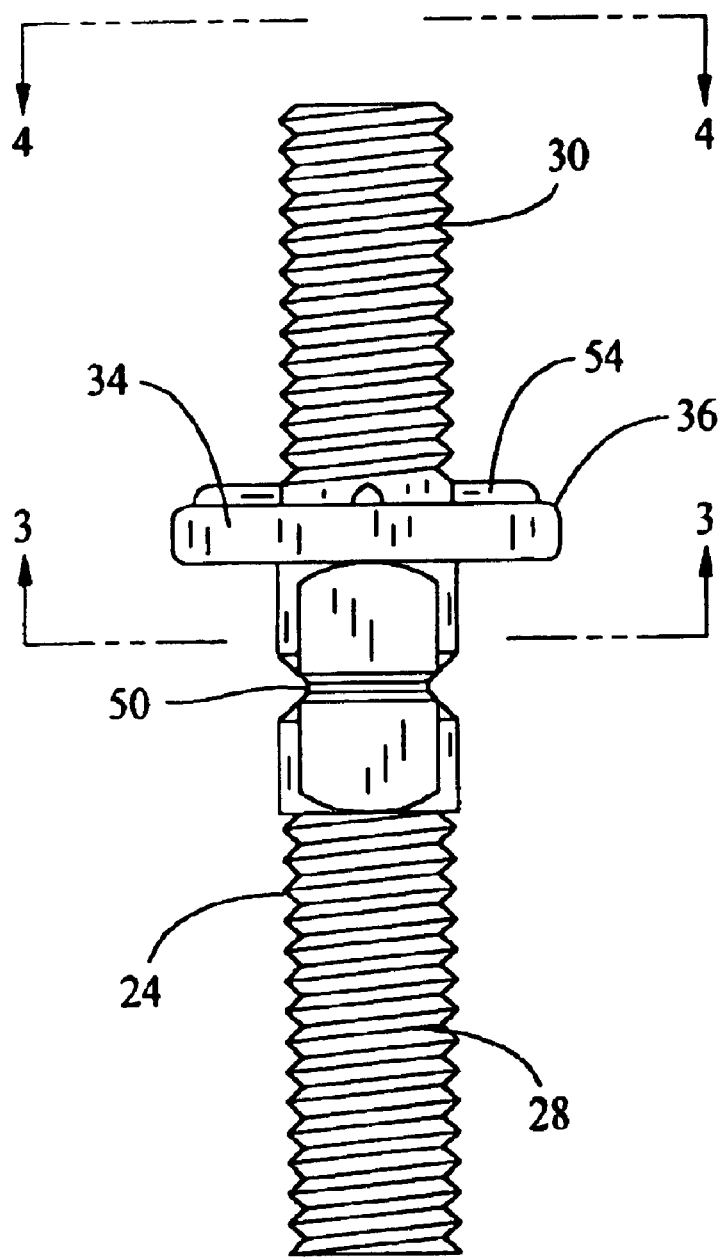
FIG. 2 is an elevational view of a known shear member according to FIG. 1.

FIG. 2 is an elevational view of known shear member 24. Shear member 24 includes a necked-down section 50 at an approximate middle of shear member 24 between first end 28 and second end 30. Necked-down section 50 has a gradually decreasing diameter relative to first end 28 and second end 30, forming a generally V-shaped profile with an apex. Necked-down section 50 has a minimum diameter at the apex that corresponds to a predetermined fracture load, and a maximum diameter that is approximately equal to a diameter of first end 28 and second end 30.

Figure 3:
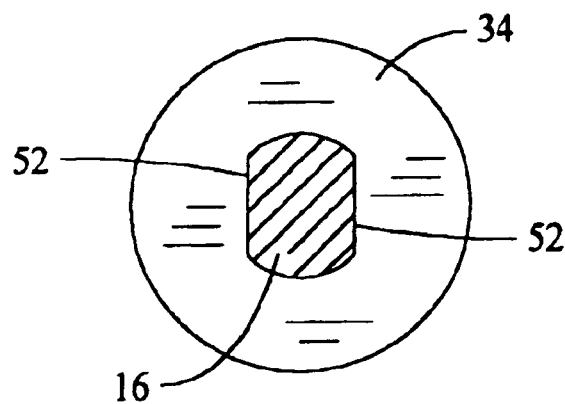
FIG. 3 is a cross-sectional view of the known shear member shown in FIG. 2 along line 3—3.

FIG. 3 is a cross sectional view of shear member 24 illustrating a pair of flat sides 52. Flat sides 52 extend above and below necked-down section 50 to allow shear member 24 to be manipulated with standard tools, such as a wrench, during attachment to anchor plate 20 and support plate 40. Flat sides 52 do not affect the breaking of shear member 24 by impact, since they are positioned to be substantially parallel to a line of impact from a collision.

Figure 4:
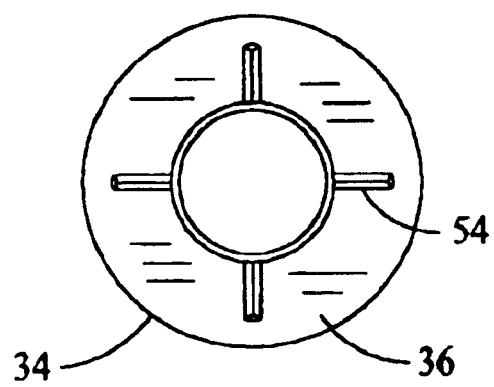
FIG. 4 is a top plan view of the known shear member shown in FIG. 2 along line 4—4.

FIG. 4 is a top view of conventional shear member 24 illustrating a plurality of ribs 54 on top surface 36 of shoulder 34. Ribs 54 are triangular in shape and extend radially along top surface 36 of shoulder 34. Ribs 54 engage first side 42 of support plate 40 (shown in FIG. 1) with a gripping action.

Figure 5:
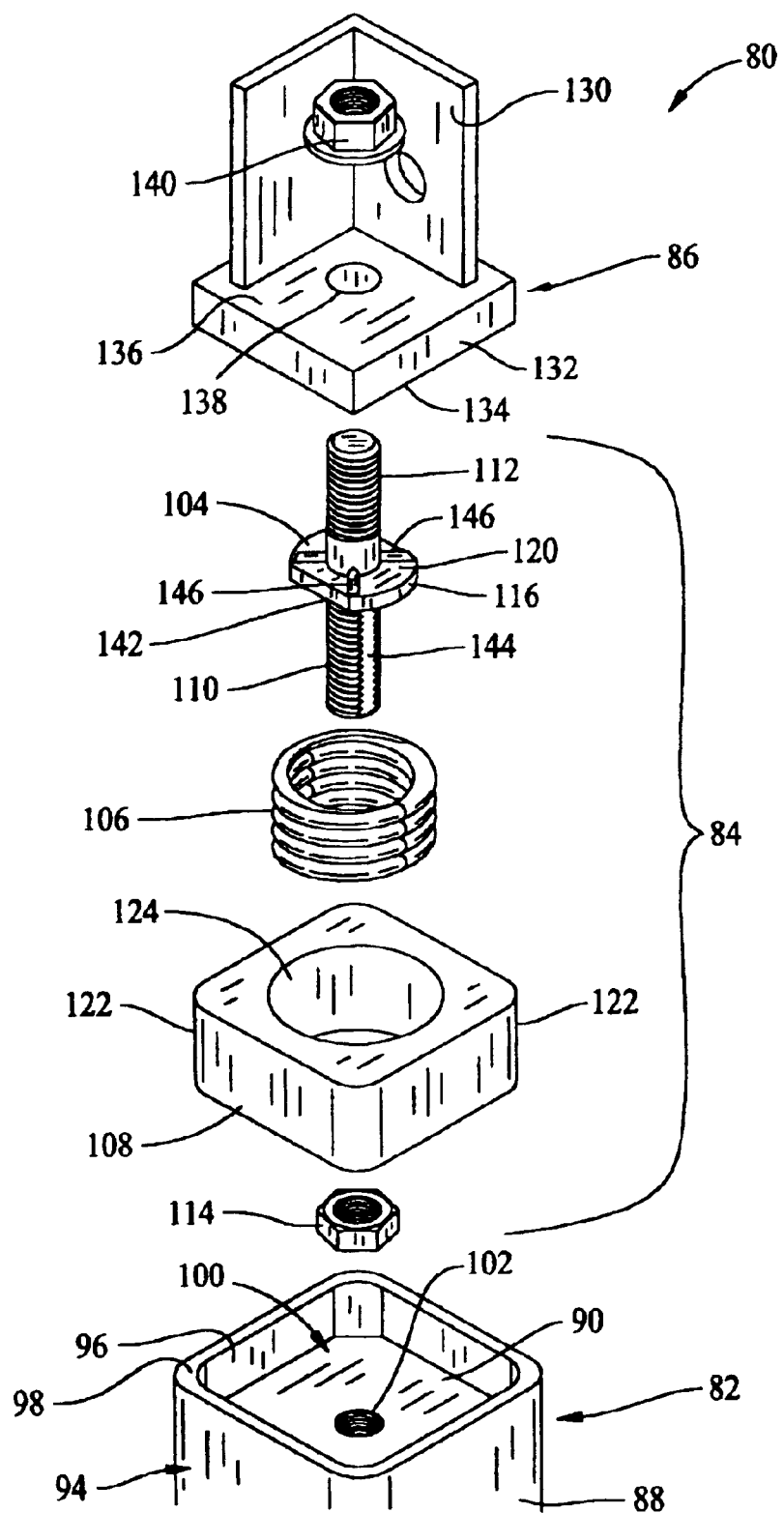
FIG. 5 is an exploded view of one embodiment of a breakaway sign post assembly.

FIG. 5 is an exploded view of one embodiment of a breakaway sign post assembly 80 including an anchor member 82, a breakaway connector 84, and a support member 86. Anchor member 82 includes a ground anchor connector 88 and an anchor plate 90. Ground anchor connector 88 is elongated and has a generally square cross-section. Furthermore, connector 88 includes an opening 92 (shown in FIG. 6) extending through the length thereof, a first end 94, a first end wall 96, and a first end face 98. Alternatively, connector 88 may have a variety of other shapes including, but not limited to, L-shaped, circular, U-channel or flanged beam cross sections. Anchor plate 90 is attached to first end wall 96 of ground anchor connector 88 adjacent first end 94. More specifically, anchor plate 90 is spaced from first end face 98, such that anchor plate 90 and first end wall 96 form the boundaries of a recess 100 within first end 94 of ground anchor connector 88. In the exemplary embodiment, recess 100 is generally square and includes filleted corners. Alternatively, recess 100 is defined by a variety of other shapes, including, but not limited to, rectangular, circular, or triangular shapes.

Anchor plate 90 is coupled substantially perpendicularly to ground anchor connector 88. Anchor plate 90 is generally square and includes a threaded opening 102 therethrough for receiving connector 88 therethrough. Alternatively, anchor plate 90 may be connected to connector 88 in a variety of other means, including, but not limited to welding or bolting. In addition, ground anchor connector 88 may be shaped alternatively to accommodate ground members 88 of various sizes and shapes. In a further embodiment, anchor plate 90 includes a plurality of openings 102.

Breakaway connector 84 includes a shear member 104, a spring 106 and a bushing 108. Shear member 104 includes a first threaded end 110 and a second threaded end 112. First end 110 is threaded through anchor plate opening 102 and is secured to anchor plate 90 with a first flanged, serrated nut 114. Second end 112 of shear member 104 includes a shoulder 116 that is substantially circular and has an outer radius and a top surface 120.

Spring 106 is inserted over and substantially surrounds shear member 104. In one embodiment, spring 106 is a helical spring. However, it will be understood that spring 106 may be any spring capable of supporting shear member 104. Bushing 108 is inserted over, and substantially surrounds, spring 106 and shear member 104. Bushing 108 is fabricated from a high-density rubber, or another highly-resilient material, and is shaped to fit at least partially within ground connector recess 100. In one embodiment, bushing 108 has a durometer rating of about 70. In another embodiment, bushing 108 is generally square and includes rounded corners 122. Alternatively, a variety of other bushing shapes may be used, including, but not limited to, rectangular, circular, or triangular shapes. Bushing 108 includes a substantially circular opening 124 extending through a length thereof. In one embodiment, circular opening 124 of bushing 108 has a diameter substantially equal to an outer diameter of spring 106 such that bushing 108 is interference fit with spring 106. In an alternative embodiment, breakaway signpost assembly 80 does not include bushing 108.

Spring 106 has an inner radius that is greater than an outer radius of shoulder 116, and is substantially equal to an outer radius of first flange nut 114. In an alternative embodiment, spring 106 and shoulder 116 have other complementary shapes than illustrated in the exemplary embodiment. For example, in an alternative embodiment, spring 106 has an inner radius that is substantially equal to the outer radius of shoulder 116. In a further embodiment, spring 106 has an outer diameter that is sized to fit at least partially within recess 100 of ground anchor connector 88. In another alternative embodiment, spring 106 has an inner diameter that is greater than the outer radius of first flange nut 114.

Support member 86 includes a sign support 130 and a support plate 132. Sign support 130 is elongated and is attached to support plate 132. Support plate 132 is substantially perpendicular to sign support 130. In the exemplary embodiment, sign support 130 has an L-shaped cross section. Alternatively, a variety of other sign support shapes are possible, including, but not limited to, square, round, U-channel or flanged beam cross sections.

Support plate 132 includes a first side 134, a second side 136 and an aperture 138 therethrough. Support plate 132 is substantially square and is welded, bolted or otherwise coupled to sign support connector 130. Support plate 132 may be shaped to accommodate sign support members of various sizes and shapes and different support configurations. Alternatively, support plate 132 includes a plurality of apertures 138.

Second end 112 of shear member 104 extends through support plate aperture 138 and support plate 132 is attached to second end 112 with a second flanged, serrated nut 140. Top surface 120 of shoulder 116 contacts first side 134 of support plate 132 and engages first side 134 with a biting action as second flanged nut 140 is tightened. Thus, support plate 132 is retained between shoulder 116 and second flanged nut 140.

Shear member 104 includes a necked-down section 142 that is at an approximate center of shear member 104 midway between first end 110 and second end 112. Necked-down section 142 has a gradually decreasing diameter relative to first end 110 and second end 112, and as such, forms a generally V-shaped profile with an apex. Necked-down section 142 has a minimum diameter at the apex that corresponds to a predetermined fracture load, and a maximum diameter approximately equal to the diameter of first end 110 and second end 112.

Shear member 104 also includes a pair of flat sides 144. Flat sides 144 extend above and below necked-down section 142 along first end 110 to allow shear member 104 to be manipulated with standard tools, such as a wrench, during attachment to anchor plate 90 and support plate 132. Flat sides 144 do not affect the breaking of shear member 104 by impact, since they are positioned to be substantially parallel to a line of impact from a collision.

Shear member 104 also includes a plurality of ribs 146 extending across shoulder top surface 120. Ribs 146 are triangular in shape and extend radially along top surface 120 of shoulder 116. Ribs 146 engage first side 134 of support plate 132 with a gripping action.

Figure 6:
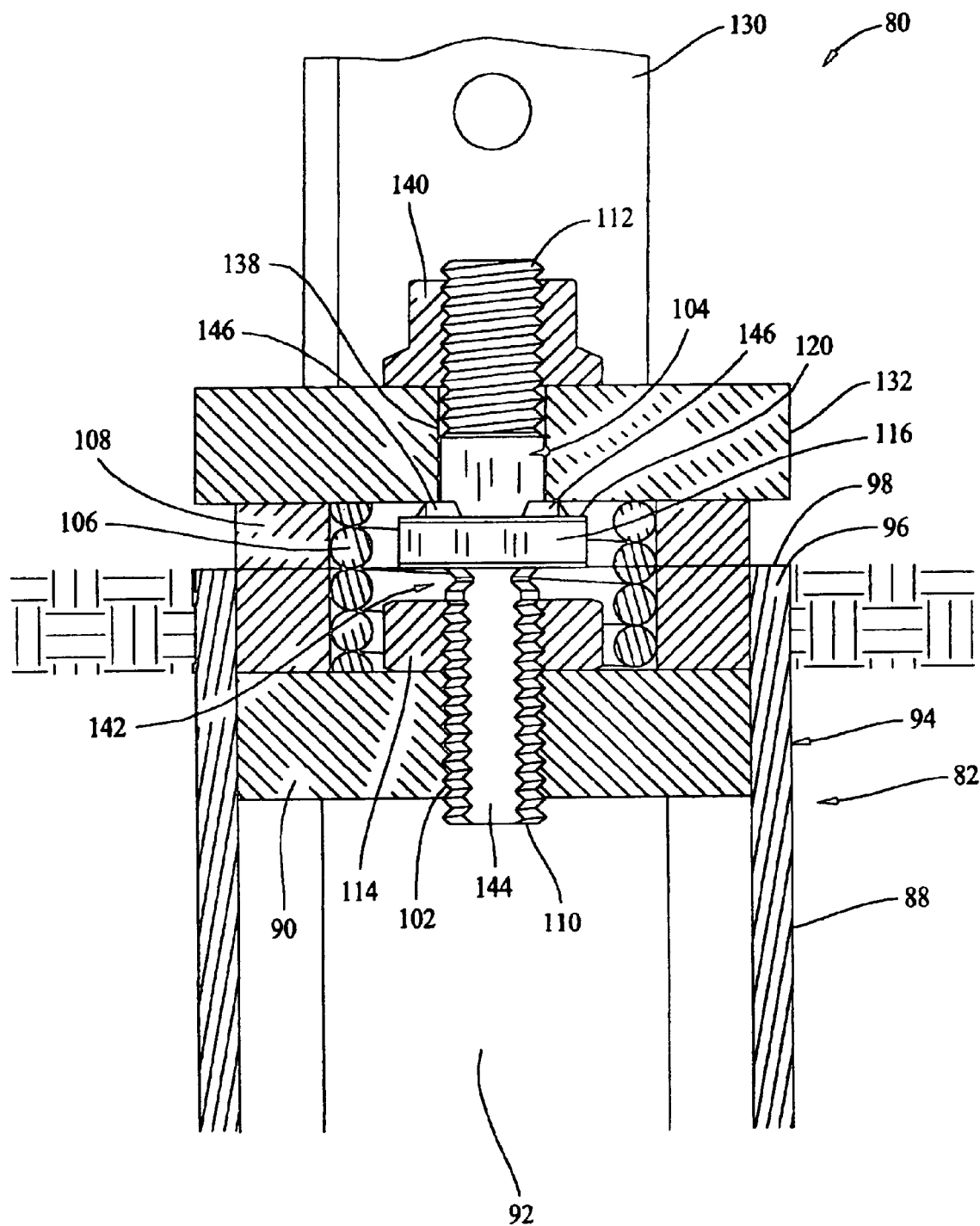
FIG. 6 is a cross-sectional view of the breakaway sign post assembly shown in FIG. 5.

FIG. 6 illustrates an assembled sign post assembly 80. Signpost assembly 80 is assembled by placing ground anchor connector 88 into the ground anchor by bolting or welding. In addition, ground anchor connector 88 and a corresponding anchor may be anchored to the ground according to methods well known in the art, such as using concrete to stabilize ground anchor connector 88 and prevent shifting of anchor member 82. Anchor plate 90 is generally level with respect to, and perpendicular to, ground anchor connector 88.

First end 110 of shear member 104 is threaded into anchor plate 90 through opening 102 until anchor plate 90 contacts first flanged nut 114. First flanged nut 114 is then torqued against anchor plate 90 to create a double nut lock. Spring 106 and bushing 108 are positioned adjacent the top surface (not shown) of shoulder 116 and are then slid over shear member 104 and shoulder 116 until spring 106 and bushing 108 rest on anchor plate 90. Spring 106 and bushing 108 rest at least partially within recess 100 of ground anchor connector 88. Second end 112 of shear member 104 is then inserted through aperture 138 in support plate 132 until support plate 132 contacts ribs 146 of shoulder top surface 120 and contacts spring 106 and bushing 108. Second flanged nut 140 is then attached to second end 112 and tightened until spring 106 and bushing 108 are compressed between anchor plate 90 and support plate 132.

Spring 106 and bushing 108 surround shear member 104 and spread the wind bearing load over a greater area than necked-down portion 142 of shear member 104 providing greater resistance to wind shear than shear member 104 has alone while still allowing shear member 104 to shear in compliance with FWHA standards. In one embodiment, first wall 96 of ground anchor connector 88 at least partially supports spring 106 and bushing 108. In an alternative embodiment, wherein breakaway sign post assembly 80 does not include bushing 108, spring 106 spreads the wind bearing load over a greater area than necked-down portion 142 of shear member 104 providing greater resistance to wind shear than shear member 104 has alone while still allowing shear member 104 to shear in compliance with FWHA standards.

Multiple connectors 84 could be used for large signs and signal structures. In addition, if anchor plates 90 and support plates 132 have multiple openings 102 and apertures 138, connector 84 could be inserted through different openings and apertures in the respective plates to change the relative orientation of sign support 130 relative to ground anchor connector 88.

While the invention has been described in terms of various specific embodiments, those skilled in the art will recognize that the invention can be practiced with modification within the spirit and scope of the claims.

What is claimed is:

1. A breakaway signpost connector for attaching a sign support member to an anchor member, said connector comprising:
   a shear member having a first end, a second end, and a necked down section between said first and second ends;
   a spring surrounding said shear member and supporting said necked-down section, wherein said spring includes an outer diameter; and
   a bushing surrounding said shear member and said spring, said bushing supporting said necked-down section and comprising a substantially circular opening extending therethrough, said opening having a diameter substantially equal to said spring outer diameter.

2. A connector in accordance with claim 1 wherein said shear member comprises a bolt.

3. A breakaway signpost connector for attaching a sign support member to an anchor member, said connector comprising:
   a shear member having a first end, a second end, and a necked down section between said first and second ends, wherein said shear member comprises at least one flat side extending through said necked-down section; and
   a spring surrounding said shear member and supporting said necked-down section.

4. A breakaway signpost connector for attaching a sign support member to an anchor member, said connector comprising:
   a shear member having a first end, a second end, and a necked down section between said first and second ends, wherein said shear member comprises a shoulder extending from one of said first end and said second end;
   a spring surrounding said shear member and supporting said necked-down section; and
   a bushing surrounding said shear member and said spring.

5. A connector in accordance with claim 4 wherein said shoulder comprises an annular shoulder having an outer diameter, said spring including an inner diameter, said spring inner diameter greater than said annular shoulder outer diameter.

6. A connector in accordance with claim 4 wherein said shoulder comprises an annular shoulder having an outer diameter, said spring including an inner diameter, said spring inner diameter substantially equal to said annular shoulder outer diameter.

7. A connector in accordance with claim 1 wherein said spring comprises a helical spring.

8. A connector in accordance with claim 4 wherein said annular shoulder comprises a top surface including a plurality of ribs, said top surface configured to engage a support member.

9. A connector in accordance with claim 1 wherein said necked-down section has a maximum diameter that is smaller in diameter than said first end and said second end.

10. A breakaway sign post assembly comprising:
    an anchor member comprising an anchor plate and a ground member, said anchor plate coupled to said ground member, said anchor plate comprising a threaded opening;

a shear bolt comprising a threaded first end, a second end, and a necked-down section, said necked-down section separating said first end and said second end, said first end engaging said anchor plate opening, said second end comprising a shoulder;

a spring surrounding said bolt and said shoulder, said spring contacting said anchor plate; and a support member contacting said spring, said support member attached to said bolt at said bolt second end.

11. An assembly in accordance with claim 10 further comprising a bushing surrounding said bolt and said shoulder, said bushing contacting said anchor plate and said support member.

12. An assembly in accordance with claim 10 wherein said support member comprises a support plate and a sign support, said support plate coupled to said sign support, said support plate including an aperture, said second end of said bolt extending through said aperture.

13. An assembly in accordance with claim 10 wherein said shoulder further comprises an engagement surface, said engagement surface engaging said support plate.

14. An assembly in accordance with claim 13 wherein said engagement surface comprises at least one rib.

15. An assembly in accordance with claim 10 further comprising first and second flanged nuts, said first flanged nut coupling said anchor plate and said bolt, said second flanged nut coupling said support plate and said shoulder.

16. An assembly in accordance with claim 10 wherein said spring is compressed between said anchor plate and said support plate.

17. An assembly in accordance with claim 10 wherein said bolt further comprises at least one flat side extending through said necked-down section.

18. An assembly in accordance with claim 10 wherein said ground member is an elongated, generally square cross-section that includes an opening extending therethrough, a first end, a first end wall, and a first end face, said anchor plate coupled to said first end wall adjacent said first end and spaced from said first end face such that said anchor plate and said first end wall form a recess within said first end of said ground member.

19. An assembly in accordance with claim 18 further comprising a bushing surrounding said bolt and said shoulder, said bushing contacting said anchor plate, said bushing sized and shaped to fit at least partially within said recess.

20. An assembly in accordance with claim 19 wherein said bushing is generally square-shaped and comprises a substantially circular opening extending therethrough.

21. An assembly in accordance with claim 10 wherein said necked-down section has a maximum diameter that is smaller in diameter than said first end and said second end.

22. A method for assembling a breakaway signpost, the signpost including an anchor member, a support member, a shear member, a spring, the anchor member including an anchor plate and a ground member, the anchor plate coupled to the ground member and having an opening therethrough, the support member including a support plate and a sign support, the support plate connected to the sign support and having an aperture therethrough, the shear member including a necked-down section between a first end and a second end, the second end comprising a shoulder, said method comprising:

anchoring the ground member;

extending the first end of the shear member through the opening of the anchor plate;

attaching the shear member to the anchor plate;

inserting the spring over the shear member;

inserting the second end of the shear member through the support plate; and attaching the shear member to the support plate.

23. A method in accordance with claim 22 wherein the shear member is a bolt and the signpost further includes a flanged nut, attaching the shear member to the anchor plate comprises:

threading the flanged nut onto the first end of the bolt; and tightening the nut to the anchor plate.

24. A method in accordance with claim 23 wherein the bolt further includes opposite flat sides extending through the necked-down section, tightening the first flanged nut to the anchor plate comprises:

gripping the flat sides of the necked-down section with a wrench; and holding the flat sides stationary while rotating the nut.

25. A method in accordance with claim 22 wherein the shear member is a bolt, the signpost further including a flanged nut, attaching the shear member to the support plate comprises:

threading the flanged nut onto the second end of the bolt; and tightening the nut to the support plate.

26. A method in accordance with claim 22 further comprising compressing the spring between the anchor plate and the support plate.

27. A method in accordance with claim 25 wherein the opening through the anchor plate is threaded, extending the first end of the shear member through the opening further comprises threading the bolt through the threaded opening.

28. A method in accordance with claim 22 wherein the signpost includes a bushing, said method further comprising:

inserting the bushing over the spring; and compressing the bushing between the anchor plate and the support plate.

* * * * *